July 17, 1923.

H. H. BREEDEN

SAFETY DEVICE FOR INFLATING PNEUMATIC TIRES

Filed May 10, 1921

1,462,081

Inventor
H. H. Breeden
By his Attorney

Patented July 17, 1923.

1,462,081

UNITED STATES PATENT OFFICE.

HOWARD H. BREEDEN, OF MILLVILLE, NEW JERSEY.

SAFETY DEVICE FOR INFLATING PNEUMATIC TIRES.

Application filed May 10, 1921. Serial No. 468,236.

*To all whom it may concern:*

Be it known that I, HOWARD H. BREEDEN, citizen of the United States, and resident of Millville, in the county of Cumberland and State of New Jersey, have invented certain new and useful Improvements in Safety Devices for Inflating Pneumatic Tires, of which the following is a specification.

This invention relates to air injectors, having reference particularly to a safety device for inflating pneumatic tires and the like; the principal object of the invention being the provision of automatic means for the prevention of over inflation and bursting of the tire while under the process of inflation; a further object being to provide a device of this character which constitute means for gaging the air supply, whereby it may be compressed within the tire under a predetermined degree of pressure.

The above named and other objects are attained by employing a spring-pressed safety valve, a lever, a slidably adjustable spring for normally maintaining said valve closed, means for gaging and indicating a predetermined degree of air pressure, and a housing constituting means for mounting and enclosing said elements and air inlet and outlet passageways, all as hereinafter fully described and specifically set forth in the appended claims.

In the accompanying drawings forming part of this specification, Figure 1 is a side view illustrating an embodiment of my improvements;

Figure 1:
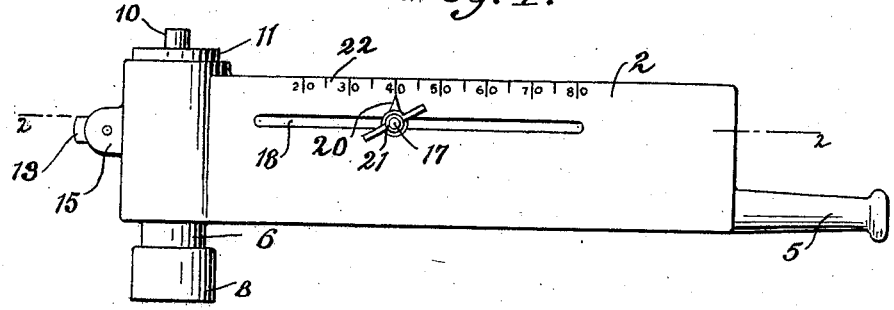
Figure 2:
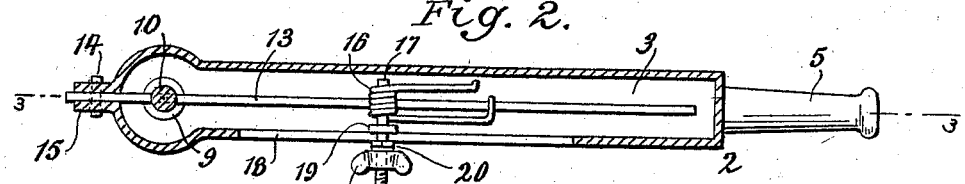
Figure 2 is a sectional plan view taken on the line 2—2 of Figure 1.
Figure 3:
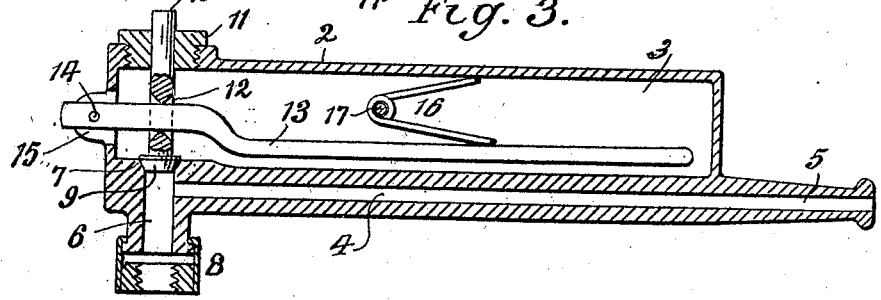
Figure 3 is a longitudinal sectional elevation taken on the line 3—3 of Figure 2.

In the drawings, 2 indicates a rectilinear housing embodying a closed compartment 3 and a horizontal passage-way 4, which communicates at one end with an air inlet nozzle 5, and at the other end with a cylindrical air outlet passage-way 6, having at its inner end a valve seat 7, which communicates with the compartment 3, and at its lower or outer end a turnable coupling 8, adapted for engaging around the inlet, of the valve casing of a pneumatic tire or other article to be inflated.

Normally seated within the valve seat 7, is a conical valve 9, having a stem 10, which extends through a screw-plug 11 of the housing 2. Said valve stem 10 is provided with a slot 12, through which extends an elongated lever 13, which is fulcrumed on a pin 14, passed laterally through lugs 15 of the housing 2.

The valve 9 is maintained normally seated by means of a two-armed spring 16, which is coiled around a lateral spindle 17, said spindle is slidably mounted in a longitudinal slot 18 extended through the front wall of the housing 2, one arm of said spring 16 bearing on the inner surface of the upper wall of the housing 2, and the other arm bearing on the lever 13, the normal tendency of said spring being to press the lever 13 downwardly, thus maintaining the valve 9 normally closed.

Fixed to the spindle 17 is a collar 19, which bears on the back surface of the front wall of the housing 2, and a pointer 20 is slidably mounted on said spindle 17 and bears on the outer face of said front wall, the outer end of said spindle being screw-threaded for engagement with a thumb-nut 21, adapted for clamping the spindle 17 in arbitrarily selected location within the slot 18.

On the face of the front wall of the casing 2 is a scale 22, which registers with the pointer 20, whereby a predetermined degree of pressure may be indicated.

In the operation and use of the invention the spring 16 is moved to a required position and set in a predetermined correlation with the scale 22 depending on the calculated degree of pressure the article to be inflated is capable of sustaining, said pressure being indicated on the scale 22, by means of the pointer 20, the thumb-nut 21 being employed to clamp it in place. The nozzle 5 is then connected by means as a suitable hose to an air pump or other source of supply, and the coupling 8 is connected to the inlet of the valve casing of a tire or other article to be inflated. When the pressure within the tire exceeds the predetermined or safety degree, said pressure automatically lifts the valve 9, against the tension of the spring 16, permitting the air to exhaust through the slot 18, thus obviating liability of bursting the tire by excessive air pressure, or over inflation.

I do not wish to be understood as limiting myself to the specific construction and form of the mechanical elements as illustrated by the embodiment of my improvements herein shown and described, as I believe that under the spirit of my invention I am entitled to employ such variations of details as may rightly fall within the scope of the appended claims.

Having thus described my invention, what I claim as new and desire to secure by Letters Patent, is:

1. In a device of the character described, an elongated valve housing having an open slot along one side, and a lever bearing in one end, a valve seated near said end, said valve having a slotted stem, an elongated lever passing through said slot and having its end pivotally connected to aforesaid lever bearing, slidable spring means pressing against said lever to hold said valve normally closed, means extending through aforementioned slot for moving said spring to regulate the air pressure required to open said valve, and an adjacent scale indicating said air pressure.

2. In a device of the character described, an elongated valve housing having an air inlet near one end, a valve seated in said inlet, a slotted stem attached to said valve, a lever extending through said slot, one end of lever being pivotally connected to the adjacent end of said housing, spring means slidably attached to said lever to hold aforementioned valve normally closed, a slot in said housing parallel to said lever and means extending through said slot for sliding said slidable spring along said lever to regulate the air pressure required to open aforementioned valve, and a scale adjacent to said slot for indicating said air pressure for the purpose described.

Signed at Millville, in the county of Cumberland and State of New Jersey, this twentieth day of December, A. D. 1920.

HOWARD H. BREEDEN.